United States Patent
Wu

(10) Patent No.: US 8,521,976 B1
(45) Date of Patent: *Aug. 27, 2013

(54) METHOD AND SYSTEM FOR IMPROVING DISK DRIVE PERFORMANCE

(75) Inventor: Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 416 days.

This patent is subject to a terminal disclaimer.

(21) Appl. No.: 12/636,923

(22) Filed: Dec. 14, 2009

Related U.S. Application Data

(60) Provisional application No. 61/143,008, filed on Jan. 7, 2009.

(51) Int. Cl.
*G06F 13/10* (2006.01)
(52) U.S. Cl.
USPC ............................................................. 711/163
(58) Field of Classification Search
None
See application file for complete search history.

(56) References Cited

U.S. PATENT DOCUMENTS

| | | | |
|---|---|---|---|
| 7,725,666 B2 * | 5/2010 | Colegrove et al. | 711/161 |
| 2008/0172426 A1 * | 7/2008 | Patel et al. | 707/205 |

* cited by examiner

*Primary Examiner* — Duc Doan

(57) ABSTRACT

A method of writing data to a storage device that uses a first data block size, from a host system that uses a second data block size, different from the first data block size, includes receiving a request from the host system to write a host data block to the storage device, reading a storage device data block from a first location on the storage device to a buffer, where the storage device data block corresponds to the host data block, modifying the storage device data block based on the host data block, restricting writing of the modified storage device data block into the first location, and storing the modified storage device data block to a second location, different from the restricted first location. After acknowledging success of the storing, the restricting of writing of the modified storage device data block into the first location may be lifted.

18 Claims, 5 Drawing Sheets

METHOD AND SYSTEM FOR IMPROVING DISK DRIVE PERFORMANCE

CROSS REFERENCE TO RELATED APPLICATION

This claims the benefit of copending, commonly-assigned U.S. Provisional Patent Application No. 61/143,008, filed Jan. 7, 2009, which is incorporated by reference herein in its entirety.

FIELD OF INVENTION

This invention relates to a method and system for writing data to a storage device, and particularly to a method and system for maintaining data integrity when writing data to a storage device.

BACKGROUND

Certain memory devices store data in blocks of a certain size. When storing data to such a device, an entire block is typically written at once. Similarly, when reading data from such a device, an entire block is typically read at once. When a host device sends data to be written, or requests data to be read, in blocks of the same size, the system operates optimally. However, when the device operates on blocks of a first size, and the host operates on blocks of a second size, inefficiencies arise.

For example, in a magnetic disk drive, data may be stored in "sectors," where each sector is an angular portion of an annular "track." Data typically cannot be read or written from such a disk drive except in entire sectors. If the host wants to read data within a sector, the host sends a request to the drive controller, and the entire sector is read and reported back to the host. Similarly, if the host wants to modify data within a sector, the host sends to the drive controller a new version of the entire sector, to be written over the current sector contents. Each such read or write operation requires only one drive access—either to read the sector or to replace the sector, which usually requires only one physical pass over the sector, meaning only one disk revolution is required.

A common sector size has been 512 B, which means the sector includes 512 bytes of user data, plus overhead such as ECC and/or CRC information, sync marks, etc. More recently, disk drives with a sector size of 4 kB have been introduced. Each sector in one of these newer drives includes eight times as much user data (i.e., 4,096 bytes) with essentially the same amount of overhead. Therefore, the total overhead, for a disk of a given total size using 4 kB sectors, is about one-eighth of the overhead for a disk of the same total size using 512 B sectors.

However, many software applications, and even operating systems, continue to expect disk drive sectors of 512 B. This is typically handled by having the disk drive controller emulate 512 B operation. Thus, the host may request to read a certain 512 B sector. Such a sector does not actually exist, but is mapped to a portion of 4 kB sector. To fulfill the request, the drive controller reads the entire 4 kB sector into a buffer and returns to the host only the 512 B portion that the host requested. A read operation therefore results in virtually no loss of efficiency, as a single read operation is performed regardless of the sector size.

On the other hand, if the host wants to write a particular 512 B sector, the host sends that sector to the drive controller as in the past. However, as stated above, data can be written only in full sectors. In order to write the 512 B sector that the host wants to write, the drive controller must write the entire 4 kB physical sector of which the 512 B block is a portion. Even if somehow only the 512 B portion could be written, ECC, CRC, checksum, parity and/or other overhead data for the entire 4 kB sector would change, necessitating writing the entire sector. However, the host has not sent the full 4 kB sector to allow overwriting in a single operation as described above. Instead, the drive controller must read the 4 kB sector in question from the disk medium into a buffer, modify, in the buffer, the portion corresponding to the 512 B block which the host wants to write plus the modified overhead data, and then write the modified 4 kB sector back to the disk medium. This requires at least one (and generally only one) pass of the disk to read the 4 kB sector, and at least one (and generally only one) pass of the disk to write the 4 kB sector. Thus, about twice as many passes of the disk are required in emulation of write operations as compared to drives with native 512 B sectors.

In addition, if there is a failure of any kind at the disk during the write process, while that failure may be communicated to the host, the host will associate the failure only with the 512 B block that it addressed, not with other blocks in the physical disk drive sector in which the addressed block resided.

SUMMARY

A method of writing data from a host system to a storage device, where the storage device uses a first data block size and the host system uses a second data block size different from the first data block size, includes receiving a request from the host system to write a host data block to the storage device, reading a storage device data block from a first location on the storage device to a buffer, where the storage device data block corresponds to the host data block, modifying the storage device data block based on the host data block, restricting writing of the modified storage device data block into the first location, and storing the modified storage device data block to a second location, different from the restricted first location.

The method may further include acknowledging success of the storing, and after the acknowledging, lifting the restricting of writing of the modified storage device data block into the first location, and storing the modified storage device data block to the first location.

According to an embodiment of the method, the storing of the modified storage device data block to the first location occurs when the storage device is idle.

A data storage device capable of writing data received from a host system, where the data storage device using a first data block size and the host system using a second data block size different from the first data block size, includes controller circuitry that receives a request from the host system to write a host data block to the storage device, and a buffer into which the controller circuitry reads a storage device data block corresponding to the host data block from a first location on the storage device. The controller circuitry modifies the storage device data block based on the host data block, restricts writing of the modified storage device data block into the first location, and stores the modified storage device data block to a second location, different from the restricted first location.

In the data storage device, the controller circuitry may acknowledge success of the storing, and after the acknowledging, the controller circuitry may lift the restricting of writing of the modified storage device data block into the first location and store the modified storage device data block to the first location.

In an embodiment of the data storage device, wherein the controller circuitry stores the modified storage device data block to the first location when the storage device is idle.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

Figure 1:
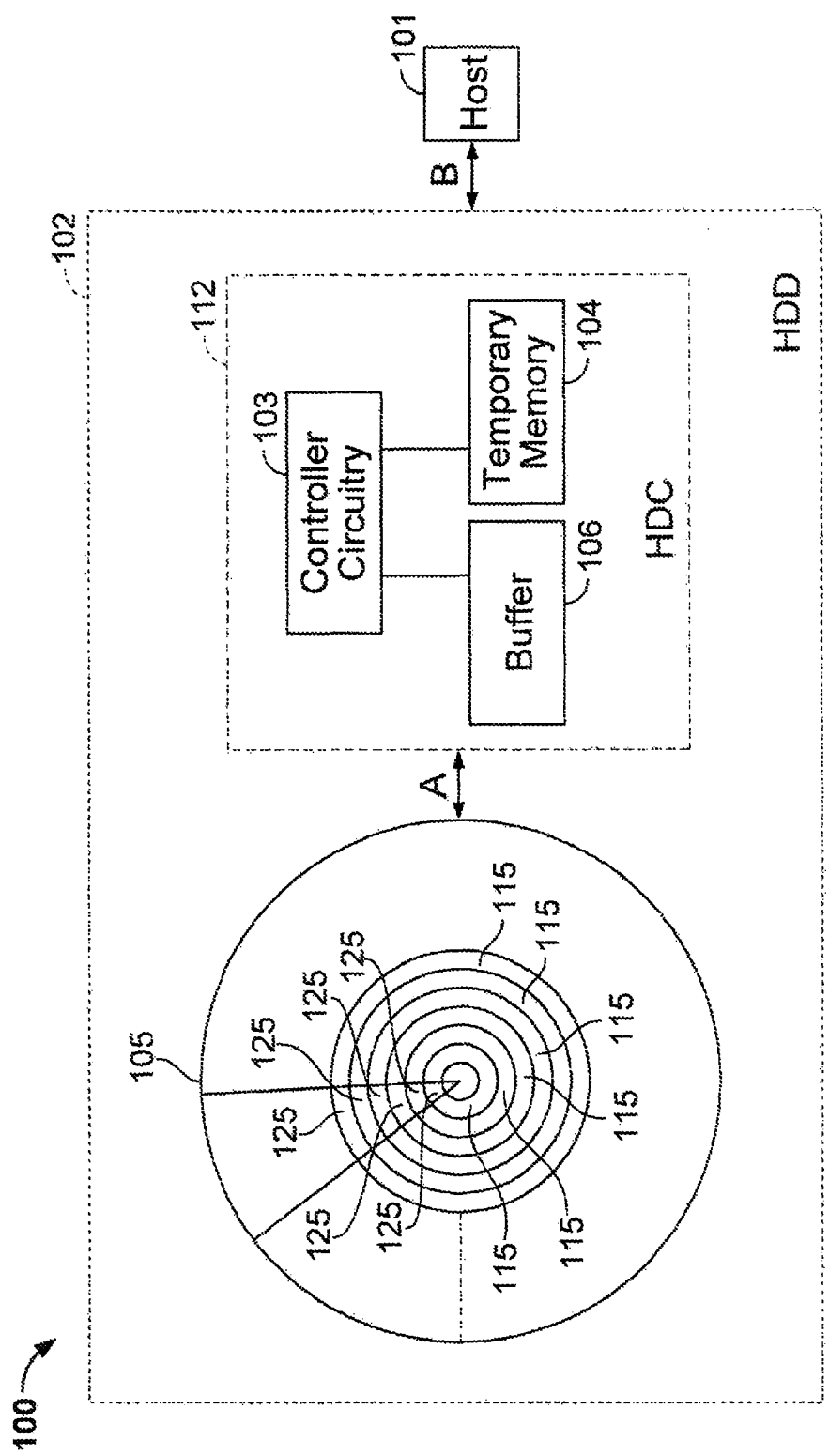
FIG. 1 is a schematic representation of an exemplary computer system including a hard disk drive unit incorporating an embodiment of the present invention.

As described in copending, commonly-assigned U.S. patent application Ser. No. 12/407,426, filed Mar. 19, 2009 and hereby incorporated by reference in its entirety, once a buffered sector of a larger second size (e.g., 4 kB in the example above) has been rewritten in the buffer to replace the smaller "sector" (e.g., the 512 B portion in the example above) within the buffered larger sector, the rewritten larger sector may be stored in a temporary memory until the rewritten larger sector can be written to the drive medium at a time when the write operation will not impact drive performance. For example, the rewritten sector may be stored until the drive is idle. Alternatively, if enough temporary memory is available, the rewritten sector may be kept in temporary memory until the system is being shut down, and may then be written to the drive. As a further alternative, if the temporary memory is nonvolatile, the rewritten sector may be kept in temporary memory even after a system shutdown—e.g., until the temporary memory is full or almost full.

Because the system may attempt to access the rewritten sector before the rewritten sector has been written to the drive, the drive's file system table or tables should be rewritten to identify the location of the rewritten sector in the temporary memory, and then rewritten again when the rewritten sector has been written back to the drive medium. The file system table or tables may include one or more tables of the type related to file systems, such as a file allocation table, a defect mapping table, an LBA (logic block address) to PBA (physical block address) mapping table, etc. Where the discussion and claims that follow, and the accompanying drawings, refer to a "file table" or "file system table" in the singular, any such reference should be understood to include both the singular and the plural, in that the "table" referred to may include one or more of the foregoing types of file system tables.

The temporary memory may be provided on the drive controller chip, as a separate chip within the drive unit, as a separate chip within the host system, or as an external device. Other arrangements are also possible.

The temporary memory may be provided as a form of nonvolatile memory such as Flash memory. However, volatile memory such as SRAM or DRAM may also be used. If volatile memory is used, then if a shutdown or power failure occurs while there is still any rewritten sector that has not been written to the drive medium, the drive could become corrupted. Therefore, care must be taken not to allow the system to be shut down without writing the rewritten sector to the drive. In addition, for the same reasons, it is likely that the rewritten sector would be kept for a shorter time in the temporary memory if the temporary memory were volatile than if the temporary memory were nonvolatile.

Drive failures may nevertheless occur while there is still a rewritten sector that has not been written to the drive medium, whether or not the system was awaiting idle time in accordance with the disclosure of the above-incorporated patent application (i.e., even if the rewritten buffered sector were to be rewritten without waiting for idle time). Such a failure could occur either because of a power failure or abnormal shutdown, as above, or because of other causes, such as a latent defect in a hard disk platter surface that manifests itself, or a physical disturbance (resulting, e.g., from an impact such as might be caused by a user jostling or dropping either the disk drive or a device in which the disk drive is contained) that affects the interface between the platter surface and the read/write head of the disk drive (sometimes referred to as a "head crash"). Such a failure also could occur with other types of storage devices. For example, a write operation to a semiconductor memory device could fail because of a strong electromagnetic pulse in the vicinity of the memory device.

When such a failure occurs, the storage device controller will send a failure notification to the host system which requested the storage device access. However, the host system will associate that failure only with the block that the host system sought to write. If the host block size is smaller for any reason than the physical storage device block size, then the host system will not associate the failure with host blocks that were part of a physical sector that had not been written to the drive medium at the time of the failure. Therefore, any data recovery efforts undertaken by the host (using, e.g., a copy of the host block intentionally cached until a write-success signal is received) would not recover the other host blocks. Moreover, even if the storage device controller were to advise the host as part of the failure message that other host blocks were affected, it is unlikely that the host will still have cached copies of those other blocks available for recovery efforts.

Therefore, in accordance with this invention, when the storage device controller writes the rewritten larger sector data back to the drive medium, the storage device controller is restricted from writing the rewritten sector back to same physical location in which the rewritten sector was previously stored, meaning that the rewritten sector must be written to a new location. In addition, the original sector location is not released in the system file tables to be overwritten by other data until the rewriting of the modified sector to its new location is successful. That way, in case of a write failure, the original sector data will be preserved so that when the host, reacting to a failure signal, initiates recovery efforts, the drive controller will have access to the data for the other blocks in the physical sector that the host is not aware were affected. Optionally, once the rewrite is successful, the drive controller, when it has time, can move the rewritten sector from its new location to the original location, rather than freeing the original location. This option may be used, for example, when it is important to maintaining physical contiguity of data in a file (i.e., to prevent file fragmentation).

As seen in FIG. 1, an exemplary computer system 100 may include a host computer or processor unit 101 and a drive unit 102 which in one embodiment may, for example, be a hard disk drive unit. A hard disk drive (HDD) unit 102 may include a hard disk controller (HDC) 112 and drive medium 105 (which may include one or more substantially circular platters). Hard disk controller (HDC) 112 may have controller circuitry 103 (e.g., on one or more integrated circuit chips) and temporary memory 104 in accordance with the present invention (which, although shown as being separate from controller circuitry 103, may be included within controller circuitry 103).

Drive medium 105 may be divided into a plurality of concentric annular tracks 115, which may be further divided into a succession of angular portions called sectors 125. As discussed above, it had been common in disk drives for a sector to have a size of 512 B, but it is becoming more common in disk drives for a sector to have a size of 4 kB. Therefore, as discussed above, controller circuitry 103 may translate between a first, larger physical sector size (e.g., 4 kB) used for signaling A within drive unit 102, and a second, smaller logical sector size (e.g., 512 B) used for signaling B between drive unit 102 and host system 101 which may have been designed to operate with drive units using the smaller sector size.

Figure 2:
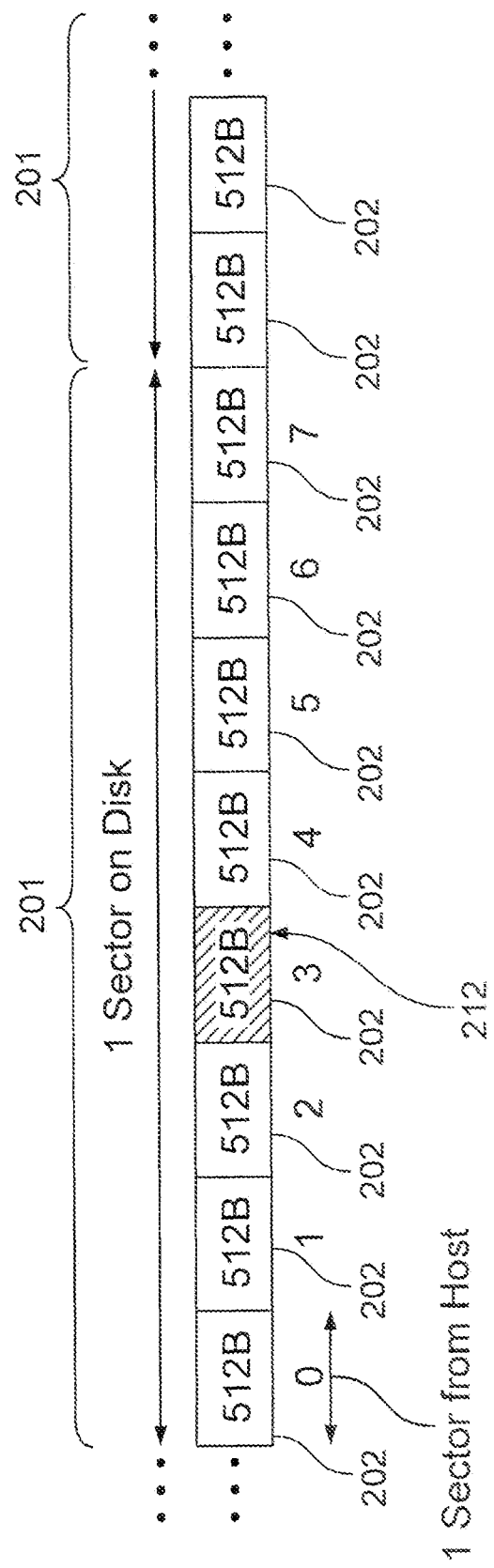
FIG. 2 shows a logical mapping of smaller disk sectors onto a larger disk sector.

The translation performed by controller circuitry 103 may be based on the mapping shown in FIG. 2 wherein each larger physical sector 201 may be divided logically into a plurality (e.g., eight, in the 512 B/4 kB example) of smaller logical sectors 202.

As discussed above, in such a system, fulfillment by drive unit 102 of read requests made by host system 101 generally does not suffer from a throughput penalty by virtue of the sector size translation. Although drive unit 102 can only read or write entire sectors, rather than portions of sectors, and therefore must read an entire sector 201 to fulfill a request to read a "sector" 202, such a read operation can be done in about the same time as reading only sector 202 (were it possible to do so). In the case of a disk drive, either read operation could be performed in a single pass of the read-write head, and therefore there is no latency for, e.g., additional drive revolutions. Indeed, it is common when reading a disk drive to read more than the requested data, so there is essentially no throughput penalty as a practical matter.

However, fulfillment of a write request may result in a throughput penalty. Because drive unit 102 can only write an entire physical sector 201, but host system 101 only provides a logical sector 202 to be written, it is not possible to simply overwrite an old sector with a new one in a single pass of read-write head. Rather, the physical sector 201 of which the target logical sector 212 is a part must be read into a buffer 106, modified in buffer 106 to substitute the new data of logical sector 212 for the contents of that logical sector, and then rewritten to the drive medium 105. At best, assuming that entire physical sector 201 can be read and written in respective single passes, and that the modifications in the buffer 106 can be accomplished in the time needed for a full revolution of medium 105, then the entire process can be performed in two passes of the read-write head. Although buffer 106 is shown separately, buffer 106 may be part of temporary memory 104.

It should be noted that only about 10% of write operations would be expected to involve only a partial physical sector 201 as in the example just given. About 90% of write operations could be expected to involve the writing of entire physical sectors, rather than the modifying of a partial physical sector, which would involve extensive writing of entire physical sectors 201. Nevertheless, if possible, it would be desirable to avoid any throughput penalty even for those 10% of operations.

It should further be noted that although the example just discussed involves traditional disk drives in which rotation time is a factor in multiple accesses, latency resulting from multiple accesses even without factoring in rotation time may still be of concern. Therefore the present invention may have applicability to other types of storage media in which data is stored in units of a predetermined size such as disk sectors. Similarly, although the invention is described in terms of "sectors" of different sizes, the invention applies to any type of data blocks of different sizes, regardless of what they may be called in a particular type of storage medium. For example, NAND flash memory uses a basic storage unit called a "page," which may be considered similar to a disk sector for purposes of the current disclosure.

When data is to be written to a smaller logical sector 202 within a larger physical sector 201, the physical sector 201 is read and buffered as described above. The buffered data is modified according to the write request, but instead of being written immediately back to drive medium 105, the rewritten sector 201 may be kept in temporary memory 104 until a later time at which writing to drive medium 105 would not affect data throughput. For example, the rewritten sector 201 may be kept in temporary memory 104 until drive unit 102 is otherwise idle. The buffer in which the data is rewritten may be part of temporary memory 104 (see FIG. 3) or even the same part of temporary memory 104 in which the data is kept after being rewritten, or may be separate memory in drive controller circuitry 103 or elsewhere (see FIG. 1).

Most disk drives in, e.g., personal computers are idle about 70% of the time on average, so it would not be necessary to maintain rewritten sector 201 in temporary memory 104 for long under normal circumstances. Nevertheless, whatever the duration during which rewritten sector 201 is kept in temporary memory 104, host system 101 may make another request to access the data in that sector. Therefore, the location of data in that sector must be available to controller circuitry 103, and so the drive's file system table may be updated to reflect that the sector in question is in temporary memory 104.

Once the rewritten sector has been stored in temporary memory 104 and noted in the file system table, it is not necessary to write the sector back to drive medium 105 as soon as drive 102 is idle. Although in one embodiment of the invention, the sector is written back to drive medium 105 as soon as possible, in other embodiments of the invention, the sector may be kept in temporary memory 104 for a time duration determined by factors such as the amount of available temporary memory 104 and the nature of temporary memory 104.

For example, if drive medium 105 is a conventional disk drive and temporary memory 104 is some form of solid-state random-access memory such a Flash memory, SRAM or DRAM, access may actually be faster while the data is in temporary memory 104 than when the data is on drive medium 105. Therefore, it may be desirable to keep the data in temporary memory 104 until the space in temporary memory 104 is needed for rewriting another sector 201 from drive medium 105. This would be a function of how much temporary memory 104 is provided in system 100.

Thus, in one alternative embodiment, data may be kept in temporary memory 104 until temporary memory 104 reaches some threshold fraction of its capacity, after which the data is written back to drive medium 105 to make room in temporary memory 104, so as not to compromise throughput by preventing the rewriting of additional sectors 201 because of the unavailability of temporary memory 104. Although in case of unavailability of temporary memory 104, system 100 operates no slower than previously known systems in which the rewritten data must be immediately rewritten to drive medium 105, such a situation can be avoided in this alternative embodiment by providing the proper amount of temporary memory 104. This can be determined by statistical analysis, for example, based on the expected use to which system 100 will be put, and may be further informed by simulations.

Another factor that affects how soon the rewritten sector 201 is written back to drive medium 105 is the type of memory used for temporary memory 104. For example, if temporary memory 104 is any form of nonvolatile memory such as Flash Memory or other NVRAM, then there is little chance of data loss (which in this case could result in drive corruption) by keeping data in temporary memory 104 until temporary memory 104 is full, or at some predetermined fraction of its capacity, even through power-down/power-up cycles of system 100.

If, on the other hand, temporary memory 104 is SRAM, DRAM or any other form of volatile memory, then data cannot be kept in temporary memory 104 through a power-down cycle of system 100, which would result in loss of the data and consequently possible drive corruption. Moreover, in case of an abnormal shut-down or power failure, the same result could occur. Therefore, in such an alternative embodiment, one would attempt to minimize as much as possible how long the data is kept in temporary memory 104. In such case, data might be written back to drive medium 105 at the first available idle time. However, even where volatile memory is used, the data may be kept for a longer period in temporary memory 104, but never past a power-down cycle of system 100. Part of the power-down sequence of such an embodiment may include a step of any writing data still in temporary memory 104 back to drive medium 105.

Temporary memory 104 also can be a mix of SRAM, DRAM or any other form of volatile memory, with some form of nonvolatile memory such as flash memory. For example, SRAM may be used in a drive as a temporary buffer for sectors that are modified, and any such sectors may be written back to disk when the drive is idling. However, in the event of sudden power loss, the controller may instruct the SRAM to transfer the buffered sectors to flash memory instead of the disk medium, because writing to flash memory may draw less power than writing to the disk medium, thereby consuming less of the available residual power. In such a case, the temporary memory 104 includes a mixture of SRAM and flash. Because most modern hard disk drives already have both SRAM and flash memory, such an arrangement is possible without substantial hardware alterations.

The foregoing example also shows that the choice of when and where to write the modified sectors can depend on a number of factors, such as the transaction type (e.g., whether it is mission critical or not) and the system condition (e.g., normal condition, power loss, etc.).

Whenever rewritten sector 201 finally is written back to drive medium 105—whether immediately, when the system is idle, or at some later time—in accordance with an embodiment of the present invention, controller 112 is restricted from writing sector 201 back to its original physical location. Instead, sector 201 is written to a new location. If the write operation is successful, then controller 112 sends a write success signal to host 101 and also notes the new location in the file system tables. If the write operation fails, then controller 112 sends a write failure signal to host 101, and keeps the old location in the file system tables. That way, the smaller blocks that host 101 did not intend to change are preserved, and controller 112 can take them into account in any recovery efforts undertaken by host 101 with regard to the smaller block that was intended to be changed.

After the write operation is ultimately successful, whether on the first or a subsequent attempt, controller 112 can move the sector 201 data back to its original location, or keep the sector 201 data where it is in its new location. Whether the data is moved back to the original location or not depends on the importance assigned to preventing file fragmentation. If rewriting occurs, the rewriting may be performed during drive or system idle time.

Figure 3:
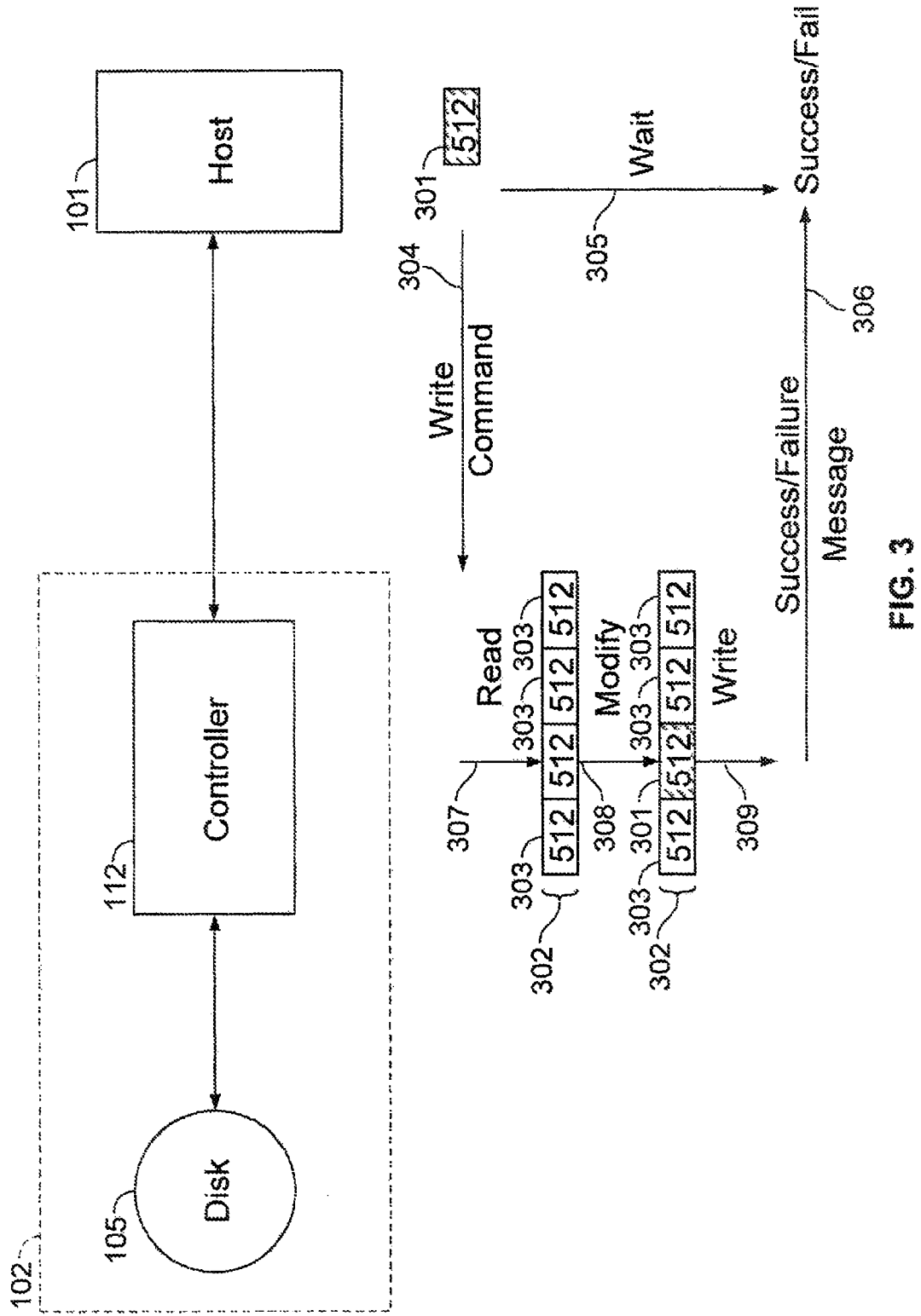
FIG. 3 shows a write operation in a previously known system.

FIG. 3 shows how a write operation might proceed in a previously known system. Host 101 instructs that smaller block 301 (depicted as 512 B) be rewritten. Smaller block 301 is actually a portion of a larger physical sector 302 including a plurality of other blocks 303. Although each sector 302 is shown as including four blocks 301/303, that is for ease of illustration only. In the embodiments discussed above, sector 302 would include eight blocks 301/303, but there could be any number of blocks 301/303 depending on the particular implementation.

As seen in FIG. 3, after issuing Write command 304, host 101 waits at 305 for a success/failure notification 306 from drive controller 112. In the meantime, controller 112 reads at 307 the original sector 302, modifies the original sector 302 at 308 by inserting the altered block 301 and changing the overhead information accordingly, and then writes the modified sector data at 309 to drive medium 105. Depending on the result of writing 309, controller 112 will send to host 101 a signal 306 indicating success or failure.

If signal 306 is "success" (not shown), then things proceed without consequence. However, if, as shown, signal 306 is "fail(ure)," host 101 will be made aware that its attempt to rewrite block 301 has failed. Host 101 may then initiate recovery actions. For example, block 301 may have been retained in working memory, or in a cache (neither shown), and if there is a failure indication, Write command 304 may be reissued. Reissuing Write command 304 would not be sufficient, however, because the remaining blocks 303 in sector 302 would have been destroyed. But host 101 is not aware of the need to recover the remainder of sector 302, nor does is host 101 necessarily have the resources (such as cached copies) to do so even if host 101 were aware of the need to recover the remainder of sector 302.

Figure 4:
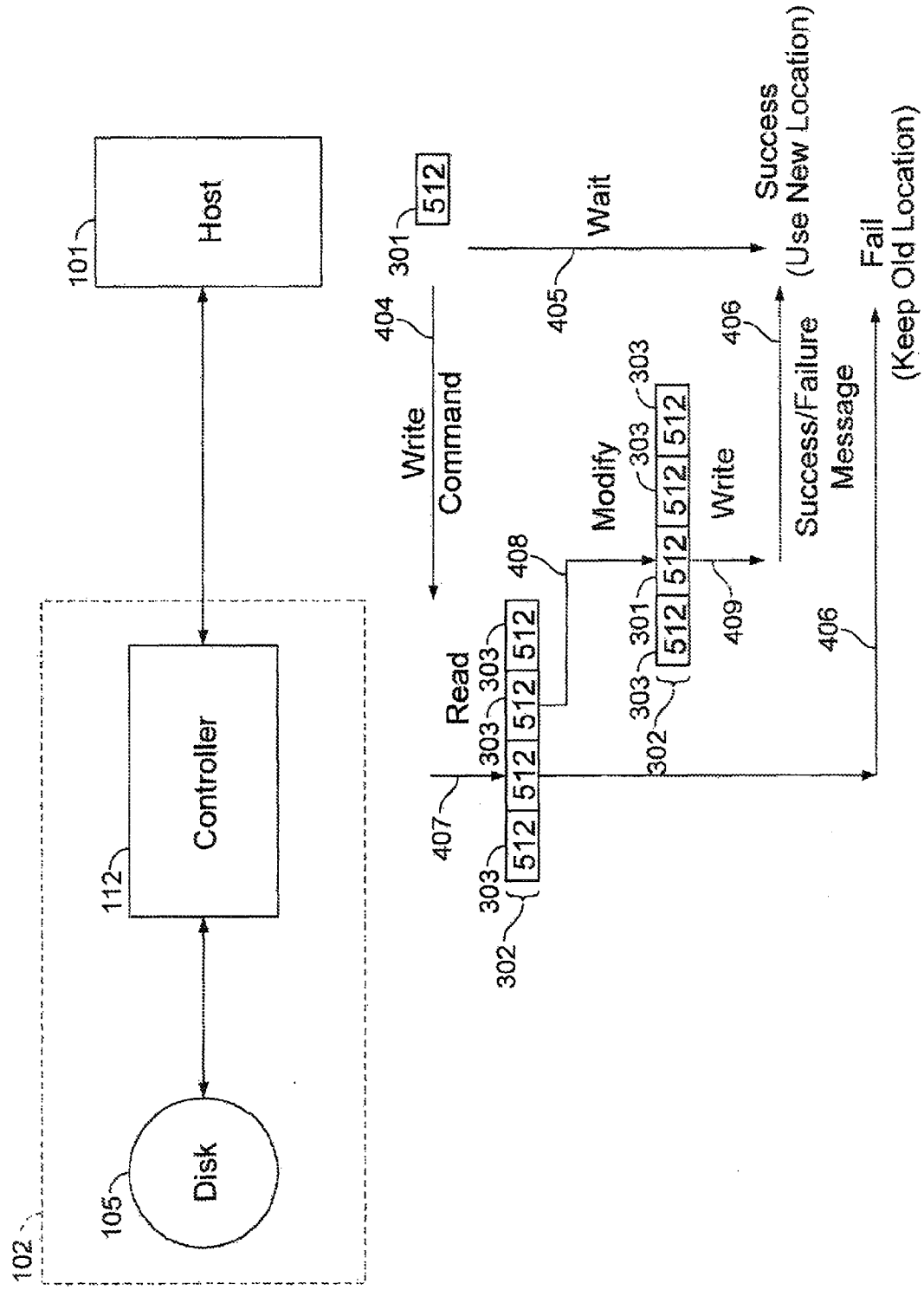
FIG. 4 shows a write operation in a system according to an embodiment of the present invention.

According to embodiments of the invention, a write operation may proceed as shown in FIG. 4 instead of as shown in FIG. 3. As seen in FIG. 4, after issuing Write command 404, host 101 waits at 405 for a success/failure notification 406 from drive controller 112. In the meantime, at 407, controller 112 reads the original sector 302, modifies it at 408 by inserting the altered block 301, and then writes it at 409 to a different location on drive medium 105, having been restricted from overwriting the original location on drive medium 105. Depending on the result of writing at 409, controller 112 will send to host 101 a signal 406 indicating success or failure.

If signal 406 is "success", then things proceed without consequence, with modified sector 302 initially remaining in its new location. Ultimately, controller 112 may move modified sector 302 back to its original location, or not, as discussed above, ultimately freeing one of the two locations for storing other data. However, if signal 406 is "fail(ure)," host 101 will be made aware that its attempt to rewrite block 301 has failed. Host 101 may then initiate recovery actions. For example, block 301 may have been retained in working memory, or in a cache (neither shown), and if there is a failure indication, Write command 404 may be reissued. Although host 101 is unaware of the need to deal with recovery of the remaining blocks 303 in sector 302, controller 112 is aware that block 301 is part of sector 302, and will read the original sector 302 in repeated operation 407. Controller 112 would not free the original location of sector 302 until it knew that some iteration of Write operation 404 had been successful.

Figure 5:
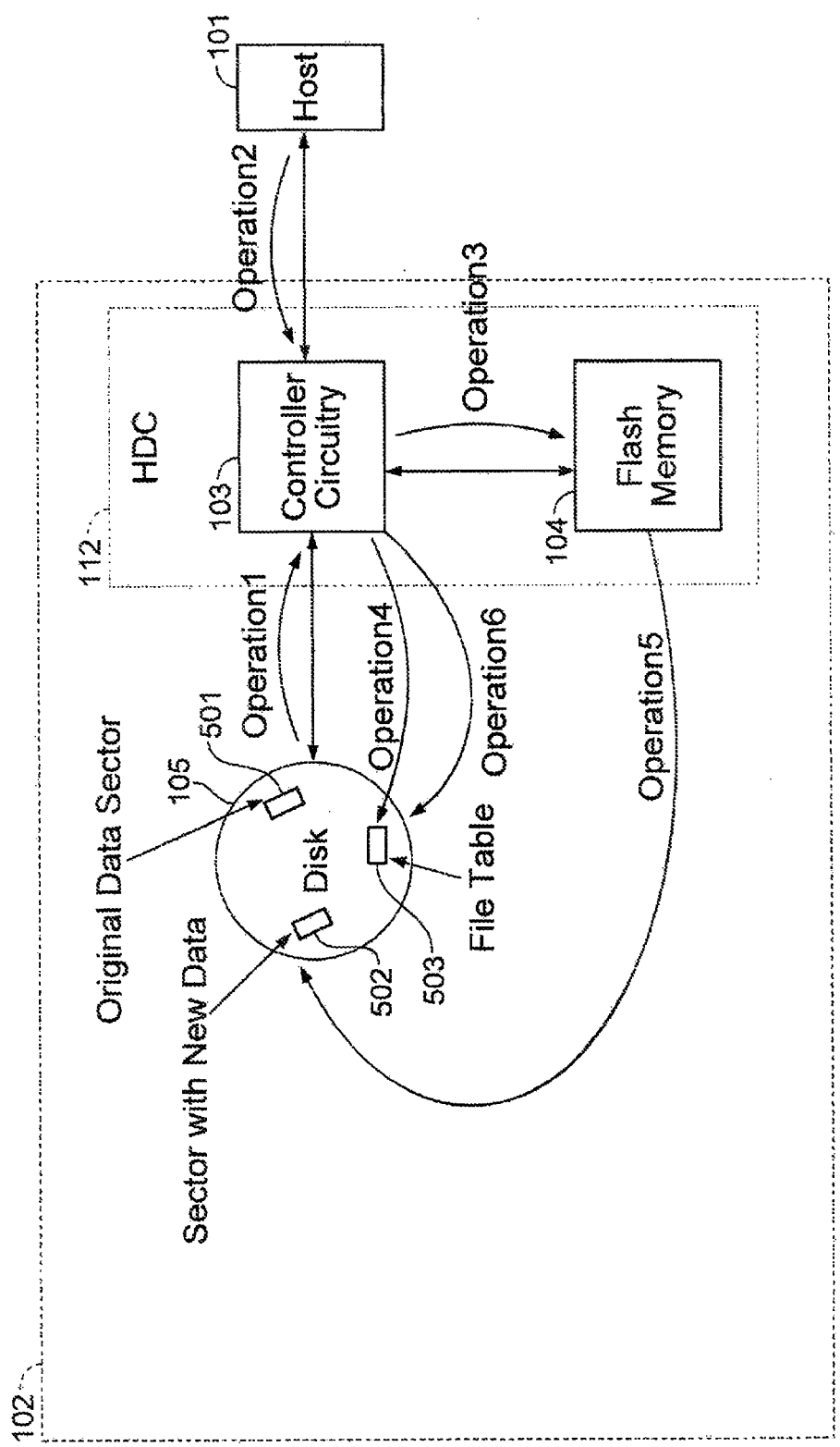
FIG. 5 shows operation of an embodiment of the present. invention on a system such as that of FIG. 1.

The flow of an exemplary embodiment of a method according to the present invention is shown in FIG. 5.

According to that method, in Operation 1, "disk sector #0" (i.e., that one of physical sectors 201 identified as #0) is read into a buffer 106 (not shown separately in FIG. 5) by hard drive controller (HDC) 103. Next, at Operation 2, "host sector #3" (i.e., the fourth one 212 of eight smaller logical "sectors" 202 within physical sector 201) is modified within the buffer according to a new "host sector #3" sent by host system 101. As part of that step, the entire "disk sector" or physical sector 201 is re-encoded if needed.

Then, in Operation 3, the rewritten "disk sector #0" is stored to Flash memory 104, which preferably is somewhere within drive unit 102 as discussed above. The step does not require spinning the disk, and accordingly represents a savings of time over previously known methods. In Operation 4, the file system table is updated to indicate that disk sector #0 is now in Flash memory 104.

The system then waits until disk medium 105 is free of other tasks (or until some later time as discussed above) and, in Operation 5, writes the new disk sector #0 back to disk medium 105. Finally, in Operation 6, after acknowledgment of a successful Write operation, the file system table is updated again to reflect that disk sector #0 is once again on disk medium 105. Operations 5 and 6 may be performed during idle time, while only Operations 1-4 need be performed in real time.

As shown in FIG. 5, the original physical location 501 of disk sector #0 on disk medium 105 before modification is different from its location 502 after modification, because of the restriction against writing to original location 501. However, the sector in location 502 ultimately could be written back to location 501. Similarly, file system table 503 is shown located on disk medium 105. However, file system table 503 also could be located elsewhere according to the design of drive unit 102.

The present invention thus improves the throughput of a drive unit in a system in which the drive unit uses a drive sector of a first size, and the system host uses a drive sector of a second size, by allowing writing of the rewritten sector back to the drive medium to be delayed until the drive is less busy. While the invention has been described in the context of the first size being larger than the second size, it may also apply where the second size is larger than the first size. Also, one or more steps of the method described above may be performed in a different order (or concurrently) and achieve desirable results. Finally, although drive medium 105 has been described as a disk drive medium, it could be any form of nonvolatile memory that is used as a storage "drive," such as a solid state drive, and including, but not limited to, any of the nonvolatile storage technologies described above in connection with temporary memory 104.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of writing data from a host system to a storage device, said storage device using a first data block size and said host system using a second data block size different from said first data block size, said method comprising:
   receiving a request from said host system to write a host data block to said storage device;
   reading a storage device data block from a first location on said storage device to a buffer, said storage device data block corresponding to said host data block;
   modifying said storage device data block based on said host data block;
   restricting writing of data into said first location;
   storing said modified storage device data block to a second location, different from said restricted first location;
   acknowledging success of said storing; and
   after said acknowledging, lifting said restricting of writing data into said first location, and storing said modified storage device data block to said first location.

2. The method of claim 1 wherein:
   said restricting writing of data into said first location comprises preventing all writing of data into said first location by preventing release of said first location in a system file table.

3. The method of claim 2 wherein said lifting said restricting of writing of data into said first location comprises allowing release of said first location in said system file table.

4. The method of claim 1, wherein said storing said modified storage device data block back to said first location occurs when said storage device is idle.

5. The method of claim 1, wherein said storing to said second location comprises writing to a nonvolatile location.

6. The method of claim 5, wherein said writing to said nonvolatile location comprises writing to one of a different location on said storage device or a nonvolatile memory.

7. The method of claim 1 wherein said restricting writing of data into said first location comprises preventing all writing of data into said first location.

8. The method of claim 7 wherein said preventing all writing of data into said first location comprises preventing release of said first location in a system file table.

9. The method of claim 1 further comprising:
   reporting failure of said storing; and
   after said reporting:
   receiving from said host system a reissued request to write said host data block, and
   re-reading said storage device data block corresponding to said host data block from said restricted first location on said storage device.

10. A data storage device capable of writing data received from a host system, said data storage device using a first data block size and said host system using a second data block size different from said first data block size, said data storage device comprising:
   controller circuitry that receives a request from said host system to write a host data block to said storage device; and
   a buffer into which said controller circuitry reads a storage device data block corresponding to said host data block from a first location on said storage device; wherein:
   said controller circuitry modifies said storage device data block based on said host data block;
   said controller circuitry restricts writing of data into said first location;
   said controller circuitry stores said modified storage device data block to a second location, different from said restricted first location;
   said controller circuitry acknowledges success of said storing; and
   after said acknowledging, said controller circuitry lifts said restricting of writing data into said first location, and stores said modified storage device data block to said first location.

11. The data storage device of claim 10 wherein:
said controller circuitry restricts said writing of data into said first location by preventing all writing of data into said first location by preventing release of said first location in a system file table.

12. The data storage device of claim 11 wherein said controller lifts said restricting of writing of data into said first location by allowing release of said first location in said system file table.

13. The data storage device of claim 10, wherein said controller circuitry stores said modified storage device data block to said first location when said storage device is idle.

14. The data storage device of claim 10, wherein said second location comprises a nonvolatile location.

15. The data storage device of claim 14, wherein said nonvolatile location comprises one of a different location on said storage device or a nonvolatile memory.

16. The data storage device of claim 10 wherein said controller restricts said writing of data into said first location by preventing all writing of data into said first location.

17. The data storage device of claim 16 wherein said controller prevents all writing of data into said first location by preventing release of said first location in a system file table.

18. The data storage device of claim 10 wherein:
said controller circuitry reports failure of said storing; and
after said reporting, said controller circuitry:
receives from said host system a reissued request to write said host data block, and
re-reads said storage device data block corresponding to said host data block from said restricted first location on said storage device.

* * * * *